United States Patent
Durboraw, III et al.

(10) Patent No.: US 6,178,195 B1
(45) Date of Patent: Jan. 23, 2001

(54) METHOD AND APPARATUS FOR DETECTING SPREAD SPECTRUM SIGNALS USING A SIGNAL FROM A SECONDARY SOURCE

(75) Inventors: Isaac Newton Durboraw, III, Scottsdale; Raymond Joseph Leopold, Tempe, both of AZ (US)

(73) Assignee: Motorola, Inc., Schaumburg, IL (US)

( * ) Notice: Under 35 U.S.C. 154(b), the term of this patent shall be extended for 0 days.

(21) Appl. No.: 09/078,802

(22) Filed: May 14, 1998

(51) Int. Cl.[7] ........................................... A61F 2/06
(52) U.S. Cl. ..................... 375/136; 342/357.12; 701/215
(58) Field of Search ..................... 375/130, 134, 375/136, 349, 137, 139, 140, 147, 347; 370/320, 335, 342, 441, 479, 337, 344, 347, 442; 455/130; 701/213, 215; 342/356, 357.01, 357.06, 357.02, 357.12, 357.16

(56) References Cited

U.S. PATENT DOCUMENTS

| | | | |
|---|---|---|---|
| 5,119,504 | 6/1992 | Durboraw, III | 455/54.1 |
| 5,594,454 * | 1/1997 | Devereux et al. | 342/357 |
| 5,617,101 | 4/1997 | Maine et al. | 342/358 |
| 5,619,211 | 4/1997 | Horkin et al. | 342/357 |
| 5,809,397 * | 9/1998 | Harthcock et al. | 455/13.2 |
| 5,844,521 * | 12/1998 | Stephens et al. | 342/357 |
| 5,966,403 * | 10/1999 | Pon | 375/208 |
| 5,969,670 * | 10/1999 | Kalafus et al. | 342/357.02 |
| 5,982,819 * | 11/1999 | Womack et al. | 375/316 |
| 5,990,825 * | 11/1999 | Ito | 342/357 |
| 5,991,279 * | 11/1999 | Haugli et al. | . |
| 5,999,561 * | 12/1999 | Naden et al. | 375/206 |
| 6,018,313 * | 1/2000 | Engelmayer et al. | 342/357 |
| 6,041,222 * | 3/2000 | Horton et al. | 455/255 |
| 6,097,974 * | 8/2000 | Camp, Jr. et al. | 455/575 |
| 6,104,978 * | 8/2000 | Harrison et al. | 701/207 |
| 6,111,541 * | 8/2000 | Karmel | 342/357.13 |
| 6,124,825 * | 9/2000 | Eschenbach | 342/357.08 |

\* cited by examiner

Primary Examiner—Chi H. Pham
Assistant Examiner—Emmanuel Bayard
(74) Attorney, Agent, or Firm—Sherry J. Whitney; Jennifer B. Wuamett; Frank J. Bogacz

(57) ABSTRACT

A method and apparatus for detecting and tracking spread spectrum signals, such as Global Positioning System (GPS) signals, first obtain precision timing and frequency reference information from a relatively high-power, secondary signal, such as that emanating from a satellite of a low-earth orbit (LEO) satellite communications system, and then use such reference information to perform narrow-band detection of the GPS spread spectrum signal. Accordingly, spread spectrum signals are more efficiently detected and tracked, particularly in environments where they are attenuated by obstacles such as buildings or environmental barriers.

2 Claims, 2 Drawing Sheets

METHOD AND APPARATUS FOR DETECTING SPREAD SPECTRUM SIGNALS USING A SIGNAL FROM A SECONDARY SOURCE

CROSS-REFERENCE TO RELATED APPLICATIONS

This application is related to the following three issued patents and one co-pending patent application which are assigned to the same assignee as the present application:

(1) "Position Locating and Communication System Using Multiple Satellite Constellations", U.S. Pat. No. 5,619,211;

(2) "Position-Aided Subscriber Unit for a Satellite Cellular System", U.S. Pat. No. 5,119,504;

(3) "Satellite-Based Geolocation Calibration System and Method", U.S. Pat. No. 5,617,101; and (4) "Method and Apparatus for Provicling Duplex Communication Service in Geographical Areas Where Conventional Services Are Obstructed",U.S. Ser. No. 08/672,171.

FIELD OF THE INVENTION

This invention relates generally to the field of detecting and tracking spread spectrum signals and, more particularly, detecting and tracking such signals for location determination purposes. More specifically, this invention relates to location determination methods and apparatuses using the Global Positioning System (GPS).

BACKGROUND OF THE INVENTION

Several practical applications require a user device to detect and track spread spectrim signals. For example, a wireless location-determination unit (herein "GPS Unit") which uses Global Positioning System (GPS) satellites to determine its approximate location must detect and track multiple spread spectrum signals from the GPS satellites.

Detection of spread spectrum signals, such as those transmitted by the constellation of GPS satellites, is typically performed using a search procedure which detects the signals in both frequency and time. When searching for the appropriate time offset, a GPS Unit may sequentially "step" or "sweep" through a range of time offsets from a reference waveform. Alternatively, a parallel process using a Fast Fourier Transform (FFT) or Surface Acoustic Wave (SAW) filter could be used.

The appropriate time offset is identified as the offset when the GPS Unit 5 detects a peak in a correlation function between an incoming GPS signal and the reference waveform. Correlation of the incoming signal and the reference waveform is typically defined by averaging the product of the incoming signal with a locally-synthesized reference waveform in the GPS Unit's receiver.

When wideband spread spectrum signals are used for communication or for precision range measurement, the detection and acquisition of the desired signal requires that the search process be restricted to very small time steps. Consequently, extensive search resources are required for acquisition when the receiver clock has any significant timing uncertainty (i.e., when a wide time range is searched).

As stated previously, the GPS Unit also performs a search in the frequency domain, thus requiring additional search resources. Similarly to the time offset search, the frequency search typically sweeps or steps through a range of frequencies to detect a peak in a frequency correlation function.

The frequency search process is made more difficult when the incoming signal is very weak. An incoming signal may be weak for several reasons. For example, the signal may have been transmitted at a low power, the distance between the transmitter and the GPS Unit may be great, or the GPS Unit may be in an environment where signal reception is attenuated (e.g., inside a building). For very weak signals, the signal dwell time must be sufficient to provide detectability, thus placing restrictions on the frequency step that must be searched.

Because of the restrictions on the frequency step and the timing step, the efficiency of two dimensional (i.e., frequency and time) searches is a primary issue for efficient detection and acquisition of complex spread spectrum waveforms.

What is needed are a method and apparatus to more efficiently detect and track spread spectrum signals, particularly weak spread spectrum signals. Particularly needed are a method and apparatus to rapidly determine location using GPS signals in environments where the incoming GPS signals are attenuated.

DETAILED DESCRIPTION OF THE DRAWINGS

Figure 1:
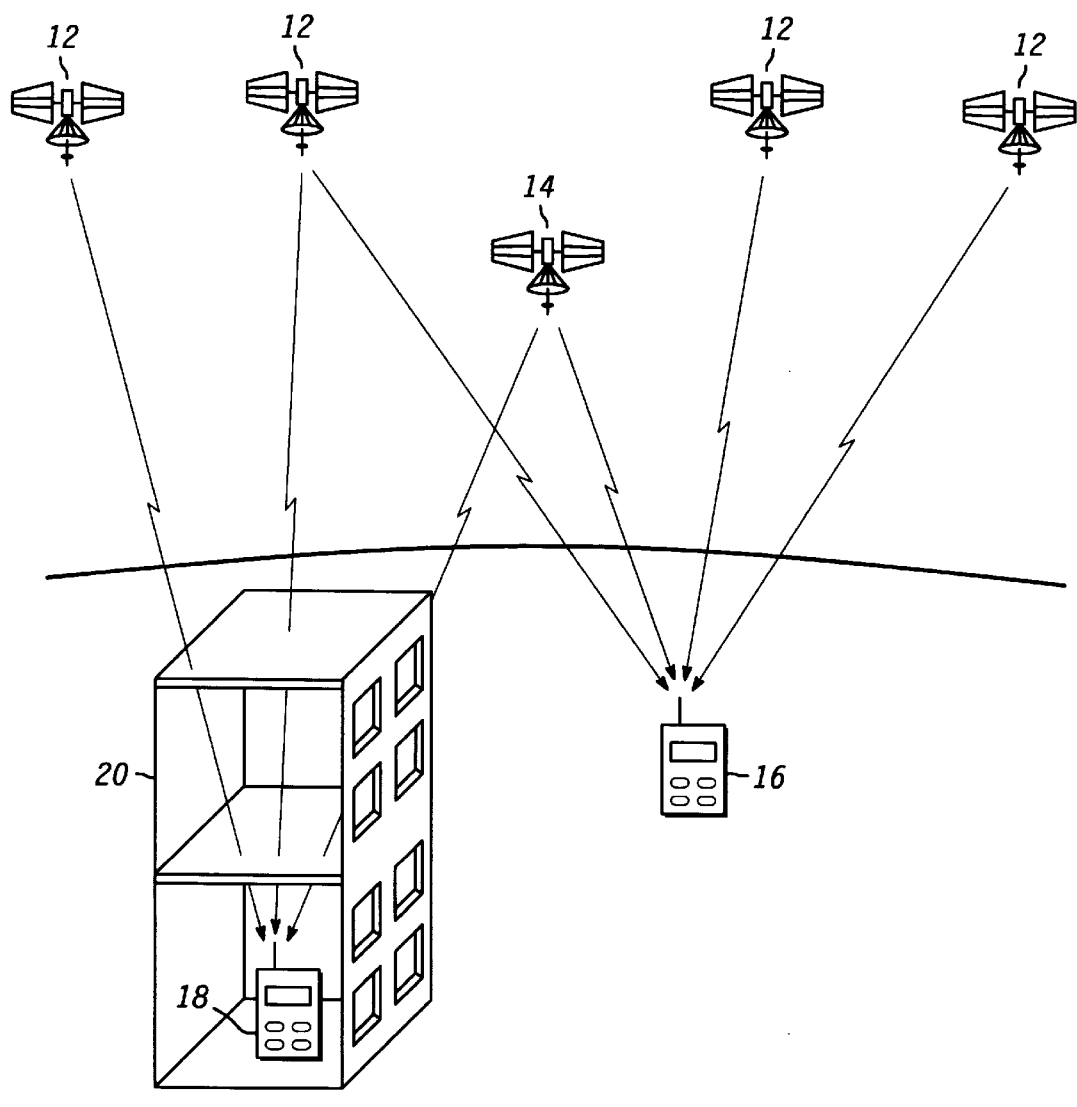
FIG. 1 illustrates a simplified diagram of an exemplary system which provides efficient Spread Spectrum Signal detection in accordance with a preferred embodiment of the present invention.

The method and apparatus of the present invention enables efficient detection and acquisition of spread spectrum signals, including spread spectrum signals which may be too weak to be detected by prior-art methods. In particular, the method and apparatus of the present invention enable rapid detection and acquisition of GPS spread spectrum signals for determination of a GPS Unit's location, especially in environments where incoming GPS signals are attenuated.

The method and apparatus of the present invention enhance the detectability and trackability of spread spectrum signals by first obtaining approximate timing and frequency information from a relatively high-power, alternate signal, and then using that approximate information to perform narrow-band detection of the spread spectrum signal.

As used herein, the wireless unit which acquires and tracks the spread spectrum signal is referred to generally as the "Receiver Unit". For example, the Receiver Unit could be a handset which is adapted to receive GPS signals. The spread spectrum signal to be detected and acquired is referred to generally as the "Spread Spectrum Signal",and the source of the Spread Spectrum Signal is referred to as the "Primary Source". For example, the Primary Source could be one or more GPS satellites, and the Spread Spectrum Signal could be the GPS signals emanating from those satellites.

In addition, the alternate signal which is used to determine preliminary timing and frequency information is referred to generally as the "Secondary-Source Signal" or "Secondary Signal", and the source of the Secondary-Source Signal is referred to as the "Secondary Source". For example, the Secondary Source could be a non-GPS satellite, and the Secondary-Source Signal could be a signal transmitted by that satellite from which a Receiver Unit could obtain timing and frequency information. The Secondary-Source Signal could be any signal which includes relevant timing and/or frequency information and which has a good probability of reception by the Receiver Unit. In a preferred embodiment, the Secondary-Source Signal is a signal from a satellite system (e.g., the Iridium® Communications System), although other signals alternatively could be used. For example, Secondary-Source Signals could originate from terrestrial wireless systems, such as cellular telephone systems.

The method and apparatus of the present invention are described using an exemplary system which includes GPS satellites as the Primary Source, one or more Low-Earth Orbiting (LEO) satellites as the Secondary Source, and a handheld wireless unit which includes a GPS receiver as the Receiver Unit. The system described is used for the purposes of example only and is not intended to limit the scope of the present invention. The method and apparatus of the present invention could be used in any system which includes a Primary Source of a Spread Spectrum Signal, a Secondary Source of a Secondary-Source Signal having relevant timing/frequency information, and a Receiver Unit which can receive the Spread Spectrum Signal and the Secondary-Source Signal.

Also for the purposes of example, the currently-existing Iridium Communications System is used as the LEO satellite system whose satellites serve as Secondary Sources. The Iridium System satellites are excellent Secondary Sources for several reasons.

First, the Iridium satellites transmit information which an Iridium handheld receiver can use to determine precision frequency and time references. These frequency and time references can be used in accordance with the present invention to assist GPS receiver, which is functionally coupled to the Iridium receiver, in acquiring and tracking GPS signals, including very weak GPS signals (e.g., those signals which may be experienced within a building or other area of high signal attenuation).

With respect to timing information, precision clocks in each of the Iridium satellites are used for signal synthesis as well as for Time Division Multiple Access (TDMA) timing events onboard the satellite. Timing information is transmitted by the satellites in the L-band downlinks. By using this timing information, the timing uncertainty that a GPS receiver must search is greatly reduced.

With respect to frequency information, Iridium satellites transmit frequency references as well in the L-band downlink signal. By using the frequency reference established by tracking the Iridium signals and by compensating for predictable Doppler effects on the Iridium signals, a very precise frequency reference can also be established in the Iridium handheld receiver. Thus, the Iridium signals provide both a precision frequency reference and a precision timing reference that can enhance the ability of a GPS receiver to track the GPS signals.

The Iridium satellites orbit at a substantially lower altitude than the Mid-Earth Orbit (MEO) GPS satellites. Thus, if a signal from an Iridium satellite is transmitted at the same power level as a GPS signal, the Iridium signal will be much less attenuated at the earth's surface. For this reason, Iridium signals generally appear to be much stronger to a handset than a GPS signal. In areas where signals are attenuated (e.g., inside a building, underground, or in areas shaded by physical, geographic, or weather obstacles), the handheld receiver is generally much more capable of receiving the Iridium signal than the GPS signal.

In a preferred embodiment, the method and apparatus of the present invention allow enhanced detection and tracking of GPS signals by exploiting the precision frequency reference information and time reference information that is available from the Iridium System. Because the Iridium System is a worldwide resource, the synergism between the Iridium System and the GPS system is available for most users of GPS.

FIG. 1 illustrates a simplified diagram of an exemplary system 10 which provides efficient spread spectrum signal detection in accordance with a preferred embodiment of the present invention. The system of FIG. 1 includes GPS Satellites 12, Non-GPS Satellite 14, and GPS Units 16, 18.

GPS Satellites 12 are the Primary Source of the Spread Spectrum Signals. These signals are used by GPS Units 16, 18 to determine time and location information. GPS Satellites 12 would comprise a part of the entire GPS System (not shown in its entirety). The GPS System includes a group of approximately twenty-four satellites, a maximum of eight or nine of which may be visible to any Receiver Unit at one time. GPS satellites are in 12-hour orbits at approximately 22,000 kilometers above the earth. Although GPS satellites are shown in FIG. 1, the method and apparatus of the present invention could be utilized to detect and acquire any spread spectrum signal, including other satellite signal signals or terrestrial-based signals.

Non-GPS Satellite 14 is the Secondary Source of the Secondary-Source Signal. The Secondary-Source Signal contains information from which precise time and frequency references can be derived. To operate most efficiently, the Secondary-Source Signal should be easily received by the GPS Units 16, 18. For example, the non-GPS Satellite 14 transmits the Secondary-Source Signal at a known frequency (or frequencies), and that signal is of a relatively high power level and/or frequency to enable easy acquisition by GPS Units 16, 18. Secondary Satellite could be, for example, a satellite of the Iridium System. Alternatively, the Secondary-Source Signal could emanate from any other wireless source such as, for example, one or more satellites of other communications systems or a terrestrial cellular communications system base station.

In a preferred embodiment where the Secondary-Source Signal emanates from a satellite such as an Iridium System satellite, the Secondary-Source Signal is very strong and is designed to be easily acquired with a hand-held user unit. With a system such as the Iridium System, Secondary-Source Signals could be control signals, voice signals, pager signals, or other types of signals. For example, in the Iridium System, voice channels provide for 16 dB of signal margin which should be sufficient for all users operating in an unobstructed environment.

Iridium pager channels achieve significantly greater signal margin by employing an enhanced communications architecture (e.g., use of known bit patterns in the Iridium System signal which allow for reduction of Iridium receiver bandwidths and thus enhancement of detectability, by employing more energy than the voice channels, etc.). Allocation of very narrow bandwidth pager channels can be achieved by use of selectable codes in the channel. In this way, only those users with knowledge of the codes would be able to achieve the ultimate narrow bandwidth tracking for operation in areas experiencing the greatest degree of signal attenuation. In other words, the Iridium communications system paging signal could include known messaging information which can be easily correlated with a known message stored in the Receiver Unit.

While Iridium control and/or voice channels could be receivable in attenuated environments, Iridium pager channels could be receivable in severely attenuated environments. Additionally, the use of selectable codes in conjunction with the pager channels would further enhance signal detectability in severely attenuated environments.

FIG. 1 shows two GPS Units 16, 18 to illustrate the advantages of the present invention. GPS Unit 16 is shown in an unobstructed environment where signals from both GPS satellites 12 and non-GPS satellite 14 would likely be detectable.

GPS Unit 18, however, is shown inside a building 20, which may cause severe attenuation of signals. The attenuation could be so severe that GPS satellite signals may not be easy to detect by GPS Unit 18. As will be described in further detail in conjunction with FIG. 3, the method and apparatus of the present invention enhance the ability of a GPS Unit located in an attenuated environment (such as GPS Unit 18) to detect GPS satellite signals.

In prior art systems, GPS Units 16, 18 would attempt to detect and acquire a GPS signal by stepping through both frequency and time offsets to determine peaks of correlation functions between a reference signal and the GPS satellite signal. For weak GPS signals, this process can be very extensive, fairly slow, and prone to failure.

In accordance with a preferred embodiment of the present invention, GPS Units 16, 18 first obtain timing and frequency information from Secondary-Source Signals transmitted by non-GPS Satellite 14. Using this information, GPS Units 16, 18 then detect and acquire the GPS signals from GPS Satellites 12. The method by which GPS Units 16, 18 detect GPS signals in accordance with a preferred embodiment is described in detail in conjunction with FIG. 3.

Figure 2:
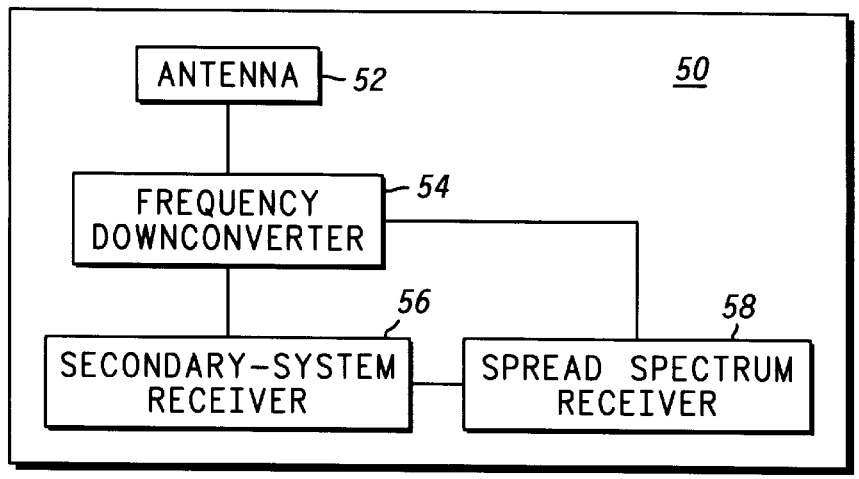
FIG. 2 illustrates a simplified block diagram of a Receiver Unit in accordance with a preferred embodiment of the present invention.

FIG. 2 illustrates a simplified block diagram of Receiver Unit 50 in accordance with a preferred embodiment of the present invention. Receiver Unit 50 includes antenna 52, frequency downconverter 54, secondary-system receiver 56, and spread spectrum receiver 58.

In a GPS application using a satellite as a Secondary Source, antenna 52 receives signals from GPS satellites and non-GPS satellites and sends those signals to frequency downconverter 54. Frequency downconverter 54 downconverts the GPS signals and the non-GPS signals to frequencies (e.g., intermediate frequencies) necessary for secondary-system receiver 56 and spread spectrum receiver 58 to perform processing on those signals. Although only one antenna 52 and frequency downconverter 54 are shown in FIG. 2, more than one antenna and/or downconverter could be used to receive and/or downconvert the signals.

As will be described in detail in conjunction with FIG. 3, secondary-system receiver 56 receives the downconverted Secondary-Source Signal and obtains timing and frequency reference information from that signal. Secondary-system receiver 56 then provides this timing and frequency reference information to spread spectrum receiver 58.

Figure 3:
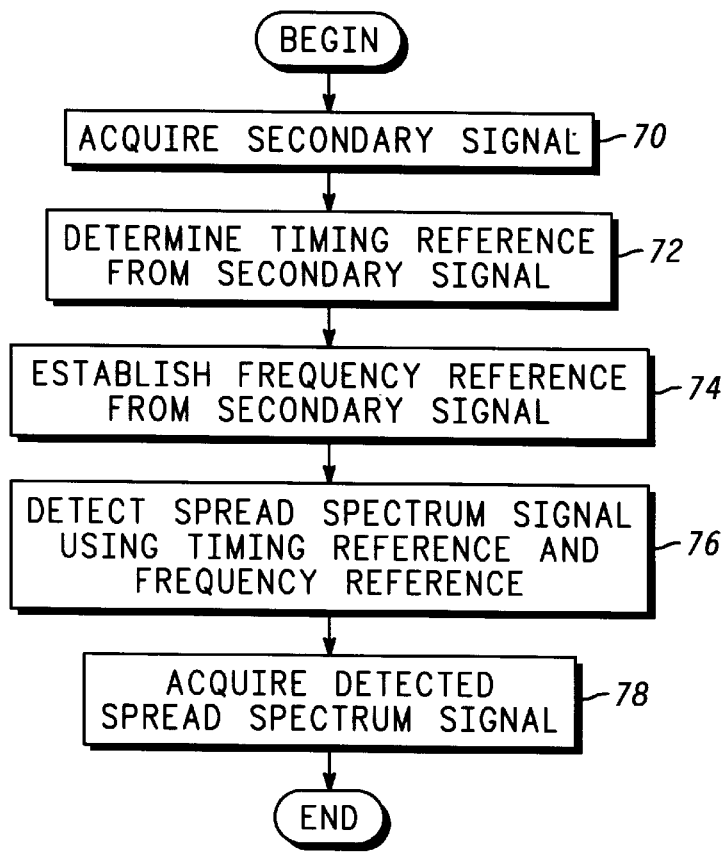
FIG. 3 illustrates a flowchart of a method for efficient detection and acquisition of a Spread Spectrum Signal in accordance with a preferred embodiment of the present invention.

As will also be described in detail in conjunction with FIG. 3, spread spectrum receiver 58 uses the timing reference and the frequency reference observed by secondary-system receiver 56 to detect the spread spectrum signal.

When the method and apparatus of the present invention are used in a GPS application with another satellite as the Secondary Source, secondary-system receiver 56 receives the Secondary-Source Signal from the other satellite (e.g., an Iridium System satellite), and the spread spectrum receiver 58 receives GPS signals.

FIG. 3 illustrates a flowchart of a method for efficient detection and acquisition of a spread spectrum signal in accordance with a preferred embodiment of the present invention. In a preferred embodiment, all steps of the method are performed by a Receiver Unit such as Receiver Unit 50 shown in FIG. 2. In alternate embodiments, some steps could be performed by other devices.

The method begins, in step 70, by the Receiver Unit acquiring a Secondary-Source Signal (e.g., an Iridium signal) transmitted by a Secondary Source (e.g., an Iridium satellite). As stated previously, the Secondary-Source Signal includes information from which a timing reference and a frequency reference can be determined.

Next, in step 72, the timing reference is determined from the Secondary-Source Signal. For example, the timing reference could be determined from an Iridium signal by evaluating a bit pattern of the Iridium signal. Methods for determining a timing reference from a signal such as an Iridium signal are known to those of skill in the art.

In step 74, a frequency reference is then determined or established from the Secondary-Source Signal. In a preferred embodiment of the present invention, the frequency reference is established by determining a carrier frequency of the Secondary-Source Signal. The carrier frequency could be determined by observing a received signal frequency, identifying a Doppler offset of the received signal frequency, and determining the carrier frequency by adjusting the received signal frequency by the Doppler offset. The frequency reference could then be established as the carrier frequency.

In step 76, the spread spectrum signal is then detected using the frequency reference and the timing reference. The frequency reference is used to generate a highly-precise synthesized reference signal which is used for GPS signal detection. The timing reference is used to align the synthesized reference signal with the timing of the received spread spectrum signal.

Once the spread spectrum signal is detected, the signal can be acquired in step 78 in any suitable way known to one of ordinary skill in the art. The method then ends.

Although the preferred embodiment of the present invention determines both timing and frequency reference information from a Secondary-Source Signal, alternate embodiments could determine either timing or frequency reference information. Such alternate embodiments may not achieve all the advantages of the method and apparatus of the present invention, but some benefits could be achieved using only one of the reference values.

Other methods exist for further reducing the GPS bandwidth by recognizing the redundancy in the GPS message structure and taking advantage of known data in the navigation message. The GPS signals contain biphase modulated data at 50 bits per second. Most GPS receivers use a tracking bandwidth wider than this level that allows detection of data bits with no a-priori knowledge of data bits. However, with a-priori knowledge of GPS data bits, detection and tracking bandwidth can be reduced to sub-Hz levels which greatly enhances the signal margin of the GPS receiver and allows tracking of the very weak GPS signals within buildings. Methods for exploiting a-priori knowledge of data bits within the GPS message structure can be used to further enhance the method and apparatus of the present invention.

In summary, the method and apparatus of the present invention enhance the detectability and trackability of Spread Spectrum Signals using narrow band tracking means afforded by combining a secondary system receiver (e.g., an Iridium System receiver) with a spread spectrum receiver (e.g., a GPS receiver). When applied to GPS, the method and apparatus of the present invention allow enhancement of detection and tracking of GPS signals by exploiting the precision frequency and time references that are available from a secondary system, such as the Iridium System.

The method and apparatus of the present invention have been described in the context of detection and acquisition of GPS signals. However, the method and apparatus of the present invention could be used in any system in which efficient detection of relatively-weak spread spectrum signals is desired. In addition, whereas the description uses the Iridium System satellites as an exemplary Secondary Sources, other Secondary Sources which enable determination of precise timing and frequency information could also be used.

The foregoing description of the specific embodiments will so fully reveal the general nature of the invention that others can, by applying current knowledge, readily modify or adapt for various applications such specific embodiments without departing from the generic concept and, therefore, such adaptations and modifications should and are intended to be comprehended within the meaning and range of equivalents of the disclosed embodiments. It is to be understood that the phraseology or terminology employed herein is for the purpose of description and not of limitation.

Accordingly, the invention is intended to embrace all such alternatives, modifications, equivalents and variations as fall within the spirit and broad scope of the appended claims.

What is claimed is:

1. A GPS receiver unit for detecting a GPS spread spectrum signal transmitted from a GPS satellite, the GPS receiver unit comprising:

a non-GPS satellite receiver for receiving a non-GPS satellite signal transmitted by a non-GPS satellite, wherein the non-GPS satellite signal enables determination of a timing reference and a frequency reference;

a GPS spread spectrum receiver detects the GPS spread spectrum signal from a GPS satellite; and the GPS spread spectrum receiver, coupled to the non-GPS satellite receiver, for using the timing reference and the frequency reference received by the non-GPS satellite receiver to detect the GPS spread spectrum signal.

2. The GPS receiver unit as claimed in claim 1, further comprising:

a frequency downconverter, coupled to the non-GPS satellite receiver and the GPS spread spectrum receiver, for downconverting the non-GPS satellite signal and the GPS spread spectrum signal; and an antenna, coupled to the frequency downconverter, for receiving the non-GPS satellite signal and the GPS spread spectrum signal.

* * * * *